Jan. 19, 1926.  
W. P. SHEETS  
1,570,188  
DIRIGIBLE HEADLIGHT  
Filed Nov. 9, 1923
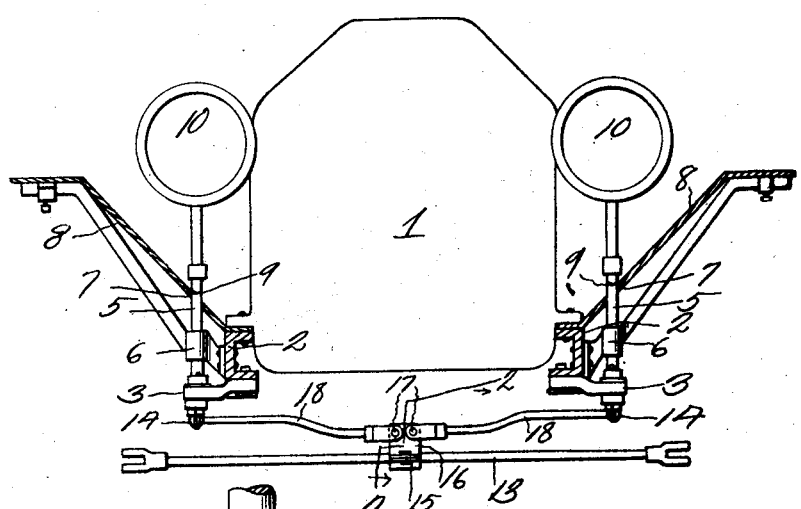
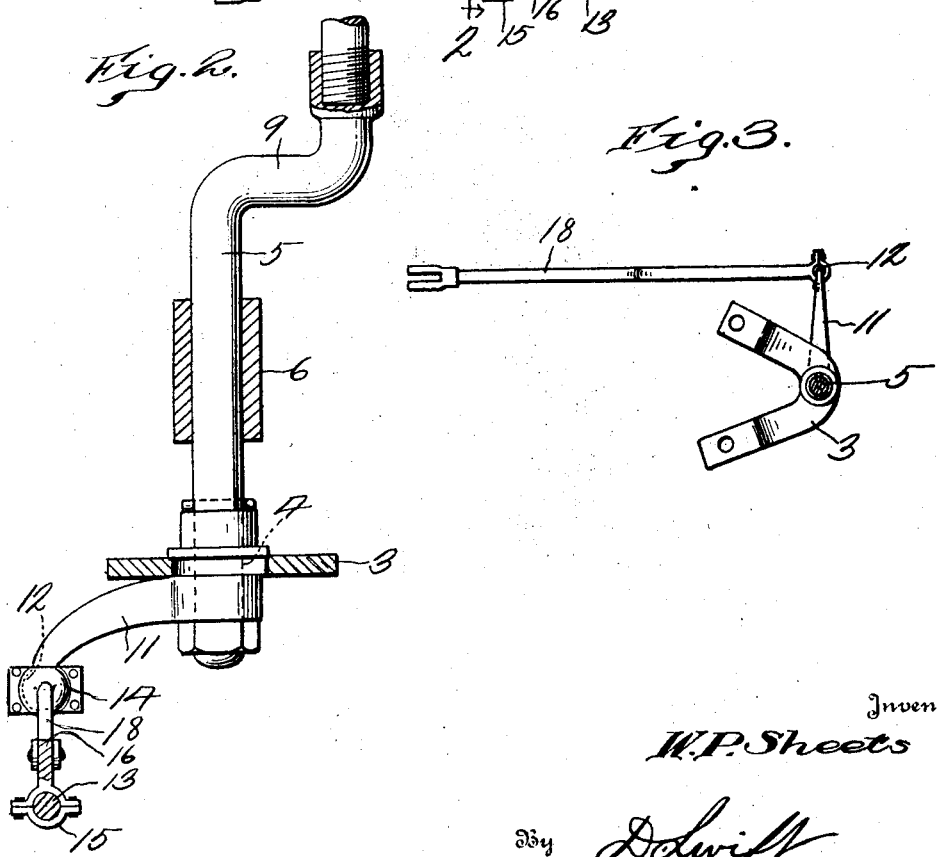
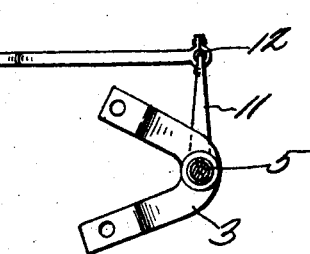
Inventor  
W. P. Sheets
By _Dewift_  
Attorney Patented Jan. 19, 1926.

1,570,188

UNITED STATES PATENT OFFICE.

WILLIAM P. SHEETS, OF GLENDALE, ARIZONA.

DIRIGIBLE HEADLIGHT.

Application filed November 9, 1923. Serial No. 673,721.

*To all whom it may concern:*

Be it known that I, WILLIAM P. SHEETS, a citizen of the United States, residing at Glendale, in the county of Maricopa, State of Arizona, have invented a new and useful Dirigible Headlight; and I do hereby declare the following to be a full, clear, and exact description of the invention, such as will enable others skilled in the art to which it appertains to make and use the same.

The invention relates to dirigible headlights for automobiles and motor driven vehicles, and has for its object to provide a device of this character wherein when the vehicle turns to the right or left, the headlights will be automatically turned in the direction of turn of the vehicle, and light rays projected onto the road bed in front of the vehicle while making the turn, thereby allowing the operator to easily observe the road and prevent accident.

A further object is to provide a dirigible headlight mechanism for motor driven vehicles, said mechanism comprising vertically disposed lamp posts rotatably mounted in bearings of brackets carried by the opposite sides of the vehicle frame and braced by brackets carried by the sides of the vehicle frame. The lower ends of the lamp posts are provided with rearwardly and downwardly extending arms, which terminate in balls above the connecting rod of the steering mechanism of the automobile. The balls of said arms are mounted in sockets of connecting rods extending towards each other in the same plane as the steering mechanism connecting rod and have their inner adjacent ends pivotally connected to an adjustable clamp carried by the steering mechanism connecting rod.

With the above and other objects in view the invention resides in the combination and arrangement of parts as hereinafter set forth, shown in the drawing, described and claimed it being understood that changes in the precise embodiment of the invention may be made within the scope of what is claimed without departing from the spirit of the invention.

In the drawing:—

Figure 1 is a front elevation of a conventional form of automobile, showing the dirigible headlight mechanism applied thereto.

Figure 2 is a detail sectional view taken on line 2—2 of Figure 1.

Figure 3 is a top plan view of one of the lamp post connecting rods and one of the supporting brackets.

Referring to the drawing, the numeral 1 designates a conventional form of automobile and 2 the side rails of the frame thereof. Secured to the under sides of the side rails 2 are outwardly extending U-shaped brackets 3 in bearings 4 of which the lower ends of vertically disposed lamp posts 5 are rotatably mounted. The lamp posts 5 are further braced by brackets 6, in bearings of which the posts are rotatably mounted. Brackets 6 are secured to the outer sides of the side rails 2 of the vehicle frame. The lamp posts 5 extend upwardly through apertures 7 in the mud guards 8 of the automobile and terminate in forwardly extending horizontally disposed portions 9, the outer ends of which support the headlights 10 of the vehicle.

It has been found that a great many accidents are caused incident to going around curves or bends in the road, at which time, if the lamps 10 are stationary the light rays are directed forwardly of the vehicle and off the road bed, and consequently the roadbed is not illuminated ahead of the automobile for the operator. To obviate the above difficulty the headlights 10 are adapted to move in the direction of movement of the automobile, so that the roadbed ahead of the automobile, when the automobile is making a turn will be illuminated. Secured to the lower ends of the lamp posts 5 are rearwardly and downwardly extending curved arms 11, which arms terminate in balls 12 in the same vertical plane as the steering connecting rod 13. Balls 12 are disposed in separable sockets 14, thereby forming a ball and socket joint whereby the running gear of the vehicle may move freely incident to bound and rebound without bending the parts of the mechanism or injuring or bending the lamp posts 5. Disposed on the connecting rod 13 is an adjustable clamp 15, which is provided with an upwardly extending plate 16, in the same plane as the rod 13. Pivotally connected at 17 to the opposite sides of said plate 16 are outwardly extending rods 18, which rods are in the same plane as the balls 12 and connecting rod 13 and carry at their outer ends sockets 14, in which the balls 12 are disposed. It will be seen that when the connecting rod 13 moves in either longitudinal direction during a steering operation the lamps 10 will simultaneously move in an opposite direction to the direction of movement of the rod 13 and consequently the lamps 10 will project light rays on the roadbed ahead of the automobile according to the direction of turn of the automobile.

From the above it will be seen that a dirigible headlight mechanism is provided, which is simple in construction, the parts reduced to a minimum and constructed in a manner whereby it may be easily applied to a conventional form of automobile without materially modifying the construction of the automobile.

The invention having been set forth what is claimed as new and useful is:—

The combination with the opposite side rails of an automobile, a transversely disposed and longitudinally movable connecting rod beneath said rails, of a dirigible headlight mechanism, said mechanism comprising vertically disposed lamp posts, said lamp posts being rotatably mounted in bearings of spaced brackets carried by the under sides of the rails and the outer sides of the rails, lamps carried by the upper ends of the posts, downwardly and rearwardly extending arms carried by the lower ends of the posts, balls carried by the ends of the downwardly and rearwardly extending arms and in the same vertical plane as the connecting rod, a clamp carried by the transversely disposed rod, an upwardly extending flange carried by said clamp, transversely disposed connecting rods pivoted to said flange in the same vertical plane as the connecting rod, the outer ends of said last named rods being provided with sockets for the reception of the balls carried by the downwardly and rearwardly extending arms and disposed below the lower ends of the posts, said flange, transversely disposed rod, connecting rods and balls being in the same vertical transverse plane.

In testimony whereof I have signed my name to this specification.

WILLIAM P. SHEETS.